United States Patent
Crenshaw et al.

(10) Patent No.: US 12,006,938 B1
(45) Date of Patent: Jun. 11, 2024

(54) INJECTION VALVE ASSEMBLY FOR A COMPRESSOR

(71) Applicant: Hanon Systems, Daejeon (KR)

(72) Inventors: Bradley Vernon Crenshaw, Riverview, MI (US); Pete Ganster, Plymouth, MI (US); Steven J. Koester, Toledo, OH (US)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 18/171,521

(22) Filed: Feb. 20, 2023

(51) Int. Cl.
| | |
|---|---|
| *F04C 29/12* | (2006.01) |
| *F04C 18/02* | (2006.01) |
| *F04C 27/00* | (2006.01) |
| *F04C 28/24* | (2006.01) |
| *F04C 29/04* | (2006.01) |
| *F16K 15/14* | (2006.01) |

(52) U.S. Cl.
CPC ........ *F04C 29/128* (2013.01); *F04C 18/0215* (2013.01); *F04C 27/008* (2013.01); *F04C 28/24* (2013.01); *F04C 29/042* (2013.01); *F16K 15/14* (2013.01)

(58) Field of Classification Search
CPC ........ F04C 2/025; F04C 18/0207–0292; F04C 15/06–068; F04C 29/12–128; F01C 1/0207–0292; F01C 21/18–186
See application file for complete search history.

(56) References Cited

U.S. PATENT DOCUMENTS

| | | | | |
|---|---|---|---|---|
| 11,384,759 B2 * | 7/2022 | Bhatia | ............... | F04C 18/0215 |
| 2021/0285445 A1 * | 9/2021 | Bhatia | ............... | F04C 18/0261 |
| 2022/0268282 A1 * | 8/2022 | Lee | ............... | F04C 23/008 |
| 2022/0290668 A1 * | 9/2022 | Lee | ............... | F04C 18/0215 |
| 2022/0299026 A1 * | 9/2022 | Ding | ............... | F04C 2/025 |
| 2022/0299032 A1 * | 9/2022 | Lee | ............... | F04C 18/0215 |
| 2022/0316475 A1 * | 10/2022 | Lee | ............... | F04C 18/0261 |
| 2022/0389929 A1 * | 12/2022 | Lee | ............... | F04C 29/128 |
| 2023/0042489 A1 * | 2/2023 | Lee | ............... | F04C 29/128 |

FOREIGN PATENT DOCUMENTS

| | | | | |
|---|---|---|---|---|
| JP | 2015129475 A | * | 7/2015 | |
| KR | 20210118666 A | * | 10/2021 | |
| KR | 20210118743 A | * | 10/2021 | |

* cited by examiner

*Primary Examiner* — Laert Dounis
(74) *Attorney, Agent, or Firm* — Shumaker, Loop & Kendrick, LLP; James D. Miller (57) ABSTRACT

A scroll compressor including a compression mechanism assembled with an injection valve assembly disposed in a housing. The compression mechanism including a fixed scroll and an orbit scroll. The fixed scroll includes a first borehole provided with a first injection port and a second borehole provided with a second injection port. The valve assembly includes a valve member, a double reed structure, a valve gasket, and a valve body. The double reed structure includes a first reed, an opposite second reed, and a connecting portion. The first reed is configured to selectively permit a flow of a fluid through the first injection port and the second reed configured to selectively permit a flow of a fluid through the second injection port.

19 Claims, 5 Drawing Sheets

INJECTION VALVE ASSEMBLY FOR A COMPRESSOR

FIELD

The disclosure relates to a compressor, and more particularly to an injection valve assembly for a compressor.

BACKGROUND

As is commonly known, vehicles typically include a heating, ventilating, and air conditioning (HVAC) system. In certain applications, a scroll compressor is employed for compressing a refrigerant circulated through a refrigerant circuit of the HVAC system. More specifically, such refrigerant circuits may be configured for use with a vapor injection scroll compressor that utilizes two different inputs of the refrigerant at different pressures and/or temperatures for optimizing the capacity of the vapor injection scroll compressor in comparison to single input scroll compressors. This is typically achieved by returning a portion of the refrigerant back towards the vapor injection scroll compressor after initially exiting the compression chambers of the vapor injection scroll compressor. Depending on the configuration of the refrigerant circuit, the returned refrigerant may be expanded via a corresponding expansion element, subcooled via a corresponding heat exchanger, or separated via a cyclone separator or the like, as well as any combinations thereof, prior to reentry back into the vapor injection scroll compressor to ensure that the returned refrigerant has the desired characteristics for the given application.

Generally, scroll compressors include a fixed scroll that remains stationary and an orbiting scroll that is nested relative to the fixed scroll and configured to orbit relative to the fixed scroll. The orbiting motion of the orbiting scroll, as well as the similar spiral shape of each of the fixed scroll and the orbiting scroll, continuously forms corresponding pairs of substantially symmetric compression chambers between the fixed scroll and the orbiting scroll. Each pair of the compression chambers is typically symmetric about a centralized discharge port of the vapor injection scroll compressor. Refrigerant typically enters each of the compression chambers via one or more inlet ports formed adjacent a radially outmost portion of the fixed scroll and then the orbiting motion of the orbiting scroll relative to the fixed scroll results in each of the compression chambers progressively decreasing in volume such that the refrigerant disposed within each of the compression chambers progressively increases in pressure as the refrigerant approaches the radially central discharge port.

The vapor injection scroll compressor is distinguished from traditional scroll compressors by injecting the returned refrigerant into each of the symmetrically formed compression chambers at a corresponding intermediate position disposed radially between the outwardly disposed inlet ports and the centrally disposed discharge port of the fixed scroll. Due to the presence of the pairs of the symmetric compression chambers between the cooperating scrolls, it is beneficial to introduce the returned refrigerant at two different injection openings that are similarly substantially symmetrically disposed relative to the centrally disposed discharge port such that each of the paired compression chambers receives a flow of the returned refrigerant at similar positions within the compression process. The injected refrigerant accordingly enters each of the compression chambers at a position corresponding to a region of the fixed scroll repeatedly subjected to a pressure of the radially inwardly flowing refrigerant that is generally intermediate the suction pressure formed at the inlet ports and the discharge pressure formed at the discharge port of the fixed scroll. The injected refrigerant originates from an injection chamber of the vapor injection scroll compressor configured to receive the returned refrigerant therein prior to reintroduction back into the compression chambers.

Additionally, the continuous orbiting of the orbiting scroll relative to the fixed scroll results in each of the injection openings formed in the fixed scroll being subjected to a variable pressure during each orbit of the orbiting scroll based on whether a corresponding portion of the orbiting scroll has passed by the corresponding injection opening with respect to each orbit cycle. It is therefore necessary for each of the injection openings of the fixed scroll to be associated with a corresponding check valve for ensuring that the returned refrigerant is injected into the corresponding compression chamber in a single flow direction. Specifically, the check valves ensure that the returned refrigerant can enter the corresponding compression chamber only when the refrigerant already disposed within the compression chamber is at a relatively low pressure that is lower than the pressure of the injected refrigerant. The check valve further prevents an occurrence wherein any compressed refrigerant at a relatively high pressure greater than that of the injected refrigerant flows in reverse (backflows) through the injection opening, through the injection chamber, and towards any components disposed upstream of the injection chamber with respect to the returned refrigerant, such as the aforementioned cyclone separator.

Such check valves may be provided as ball valves that are biased by a spring or the like to a closed position until the injected refrigerant pressure exceeds the pressure of the refrigerant present within the corresponding compression chamber. However, it has been discovered that the use of such ball valves may result in an undesirable pressure drop in the injected refrigerant that reduces the output capacity of the vapor injection scroll compressor. Other shortcomings of such ball valves may be the need for multiple components such that manufacturing complexity is increased, a need for increased axial packaging space for accommodating the motion of the ball relative to the spring, and an inconsistency of the distribution of the injected refrigerant to each of the pair of the injection openings.

Such a check valve may also be provided as a reed valve having a flexible metallic reed that flexes in response to a pressure differential thereacross. However, such reed valves are traditionally provided to include repeated metal to metal contact, which greatly reduces the durability of such reed valves and also introduces a concern of noise, vibration, and harshness (NVH) that can potentially be experienced by a passenger of a vehicle. Moreover, the conventional reed valves are part of a complex injection valve assembly that requires numerous components and complicated sealing structure.

It would therefore be desirable to develop a simplified and compact injection valve assembly for a scroll compressor to minimize manufacturing time and cost, increase discharge chamber volume, and prevent an occurrence of NVH during operation thereof.

SUMMARY

In concordance and agreement with the presently described subject matter, a simplified and compact injection valve assembly for a scroll compressor to minimize manufacturing time and cost, increase discharge chamber volume, and prevent an occurrence of NVH during operation thereof, has surprisingly been designed.

In one embodiment, a valve assembly for a scroll compressor, comprises: a valve member including a first injection aperture and a second injection aperture formed therethrough, wherein the first injection aperture is in fluid communication with a first injection port of the scroll compressor and the second injection aperture is in fluid communication with a second injection port of the scroll compressor; and a reed structure disposed adjacent the valve member, the reed structure including a first reed and an opposite second reed, wherein the reed structure selectively permits a flow of a fluid through at least one of the first injection port and the second injection port of the scroll compressor.

As aspects of some embodiments, the first reed configured to selectively permit the fluid to flow through the first injection port of the scroll compressor.

As aspects of some embodiments, the second reed configured to selectively permit the fluid to flow through the second injection port of the scroll compressor.

As aspects of some embodiments, the reed structure further includes a connecting portion connecting the first reed and the second reed, wherein the first reed, the second reed, and the connecting portion are formed as a unitary structure.

As aspects of some embodiments, the first injection port is in fluid communication with an injection chamber formed in the scroll compressor.

As aspects of some embodiments, the second injection port is in fluid communication with an injection chamber formed in the scroll compressor.

As aspects of some embodiments, the valve assembly further comprises a valve body disposed adjacent the valve member.

As aspects of some embodiments, the valve assembly further comprises a valve gasket disposed between the reed structure and the valve body, the valve gasket including a first flap configured to contact the first reed when the first reed selectively permits the fluid to flow through the first injection hole towards the first flow path.

As aspects of some embodiments, the first flap is inclined relative to a plane of the valve member.

As aspects of some embodiments, the first reed is configured to pivot away from the valve member when the first reed selectively permits the fluid to flow through the first injection hole, and wherein the first flap forms a stop surface for limiting the pivoting of the first reed away from the valve member.

As aspects of some embodiments, a peripheral opening extends around at least a portion of a periphery of the first flap.

As aspects of some embodiments, the valve body includes a first indentation formed therein and a first flow passageway extending from the first indentation through the valve body.

As aspects of some embodiments, the first reed pivots into the first indentation of the valve body when the first reed selectively permits the fluid to flow through the valve assembly to the injection port of the scroll compressor.

As aspects of some embodiments, the valve body further includes a first post having a first segment and a second segment, and wherein a part of the first flow passageway is formed in the first segment of the first post extending from the first indentation to the second segment and another part of the first flow passageway is formed in the second segment of the first post extending from the first segment to an end thereof.

As aspects of some embodiments, at least a portion of the first post is received in a fixed scroll of the scroll compressor.

In another embodiment, a valve assembly for a scroll compressor, comprises: a valve member including a first injection aperture and a second injection aperture formed therethrough, wherein the first injection aperture is in fluid communication with a first injection port of the scroll compressor and the second injection aperture is in fluid communication with a second injection port of the scroll compressor; a valve gasket disposed adjacent the valve member, the valve gasket including a first flap and a second flap; and a reed structure disposed between the valve member and the valve gasket, the reed structure including a first reed and an opposite second reed, wherein the first reed selectively contacts the first flap of the valve gasket and the second reed selectively contacts the second flap of the valve gasket.

As aspects of some embodiments, the valve assembly further comprises a valve body, wherein the valve body includes a first indentation and a second indentation formed therein.

As aspects of some embodiments, the first flap of the valve gasket is received in the first indentation of the valve body and the second flap of the valve gasket is received in the second indentation of the valve body.

In yet another embodiment, a scroll compressor, comprises: a compression mechanism including a fixed scroll and an orbit scroll, wherein the fixed scroll includes a first borehole provided with a first injection port and a second borehole provided with a second injection port; and a valve assembly coupled to the fixed scroll, the valve assembly comprises: a valve member including a first injection aperture and a second injection aperture formed therethrough, wherein the first injection aperture is in fluid communication with the first injection port of the fixed scroll and the second injection aperture is in fluid communication with the second injection port of the fixed scroll; and a reed structure disposed adjacent the valve member, the reed structure including a first reed and an opposite second reed, wherein the reed structure selectively permits a flow of a fluid through at least one of the first injection port and the second injection port of the scroll compressor.

As aspects of some embodiments, the valve assembly further comprises a valve body disposed between the valve member and the fixed scroll, wherein the valve body further includes a first post configured to be at least partially received in the first borehole and a second post configured to be at least partially received in the second borehole.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

The following description of technology is merely exemplary in nature of the subject matter, manufacture and use of one or more disclosures, and is not intended to limit the scope, application, or uses of any specific disclosure claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, all compositional percentages are by weight of the total composition, unless otherwise specified. Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIGS. 1-12 illustrate portions of a vapor injection scroll compressor 1 having an injection valve assembly 20 according to an embodiment of the present disclosure. The scroll compressor 1 may be provided as a component of an HVAC system of a motor vehicle, and more particularly, a component for circulating a refrigerant of an associated refrigerant circuit in heat exchange communication with air to be delivered to the passenger compartment of the associated motor vehicle. The refrigerant may also be in heat exchange relationship with additional components of the motor vehicle in need of heat regulation, such as a battery or other electronic components associated with operation of various different systems of the motor vehicle. References to the refrigerant as used hereinafter may refer to a refrigerant when provided solely as a gas or as a mixture of a gas and a liquid. Although the scroll compressor 1 is described as being utilized for a refrigerant of an HVAC system, it should be apparent that the structure disclosed herein may be adapted for use with any fluid in need of compression with respect to any associated fluid system, as desired.

Figure 1:
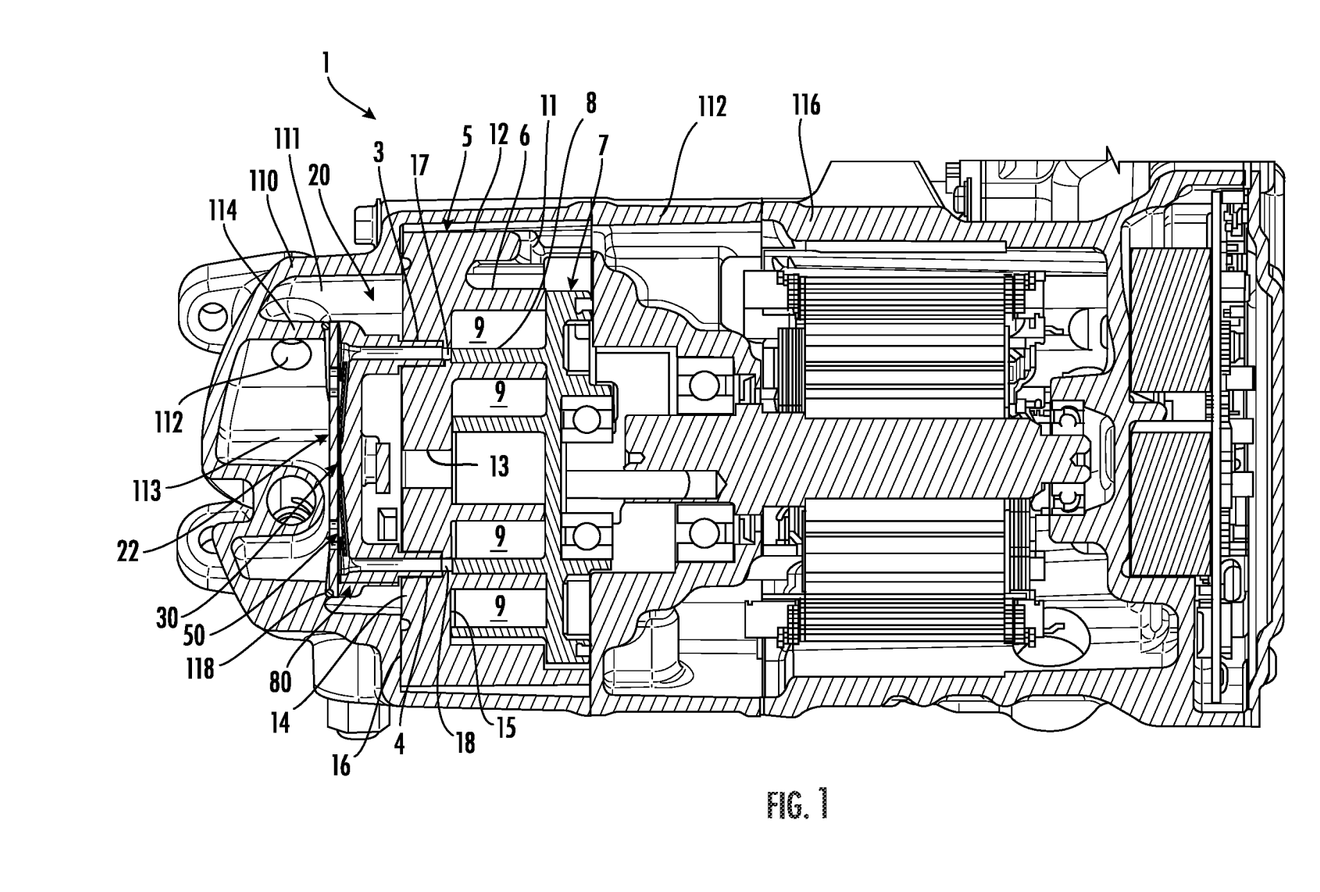
FIG. 1 is a cross-sectional view of a scroll compressor according to an embodiment of the present disclosure.
Figure 2:
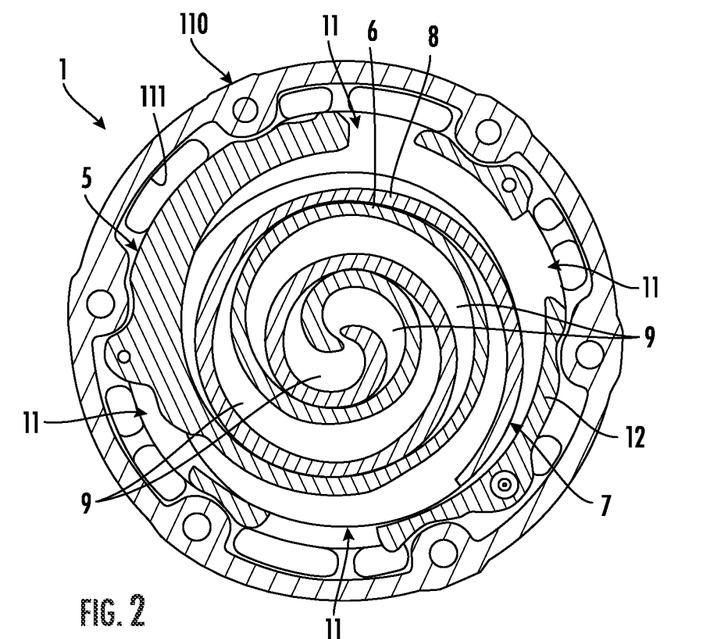
FIG. 2 is a cross-sectional elevational view taken through a compression mechanism of the scroll compressor.

In the exemplary embodiment of FIG. 1, the scroll compressor 1 includes a compression mechanism formed by a fixed scroll 5 and an orbiting scroll 7. As best seen in FIG. 2, the fixed scroll 5 has an axially extending first spiral structure 6 and the orbiting scroll 7 has an axially extending second spiral structure 8. The second spiral structure 8 extends in an opposing axial direction relative to the first spiral structure 6 with each of the spirals of the second spiral structure 8 nested into each of the spaces formed between adjacent spirals of the first spiral structure 6. The first spiral structure 6 and the second spiral structure 8 are positioned relative to each other to form a plurality of compression chambers 9 therebetween during operation of the compression mechanism of the scroll compressor 1.

The fixed scroll 5 includes at least one inlet opening 11 adjacent a radially outermost portion thereof for introducing the refrigerant into each of the compression chambers 9. In the provided embodiment, the fixed scroll 5 includes a plurality of the inlet openings 11 circumferentially spaced apart from each other in an outer circumferential wall 12 of the fixed scroll 5 with each of the inlet openings 11 provided as a hole, indentation, or other form of passageway allowing for radially inward flow of the refrigerant into one of the compression chambers 9. The refrigerant generally enters the fixed scroll 5 through one of the inlet openings 11 at a relatively low pressure typically referred to as a suction pressure of the scroll compressor 1. The fixed scroll 5 further includes a discharge opening 13 formed at a radial innermost end of the first spiral structure 6 through which the refrigerant exits each of the compression chambers 9 after having been compressed therein. The discharge opening 13 is accordingly located at or adjacent a radial center of the fixed scroll 5. The compressed refrigerant thereby exits the cooperating scrolls 5, 7 at a relatively high pressure that is greater than the relatively low pressure suction pressure, wherein the relatively high pressure is referred to as the discharge pressure of the scroll compressor 1. A reed valve assembly (not shown) comprising a reed valve and a retainer may be employed to selectively permit the compressed refrigerant from the fixed scroll 5. As illustrated, the reed valve assembly may be coupled to the fixed scroll by at least one coupling element (e.g., a mechanical fastener). However, other coupling means may be employed if desired.

The orbiting scroll 7 is configured to orbit relative to the fixed scroll 5 in a manner wherein each of the compression chambers 9 progresses circumferentially and radially inwardly towards the discharge opening 13. A shape and position of each of the compression chambers 9 accordingly changes relative to the fixed shape and position of the fixed scroll 5 during the repeating orbiting motion of the orbiting scroll 7. This motion causes each of the compression chambers 9 to reduce in flow volume as each of the compression chambers 9 approaches the radially inwardly disposed discharge opening 13, thereby causing the previously discussed compression of the refrigerant.

FIG. 2 illustrates the cross-section through the fixed scroll 5 and the orbiting scroll 7 when the compression mechanism is at a position having two pairs of opposing compression chambers 9. Each of the compression chambers 9 forming one of the pairs includes substantially the same shape rotated 180 degrees relative to the other of the paired and opposing compression chambers 9. A first pair of the compression chambers 9 is disposed immediately adjacent a radial center of each of the spiral structures 6, 8 (generally corresponding to the position of the discharge opening 13) while a second pair of the compressions chambers 9 is formed radially outwardly of the first pair of the compression chambers 9 closer to the inlet openings 11.

Figure 3:
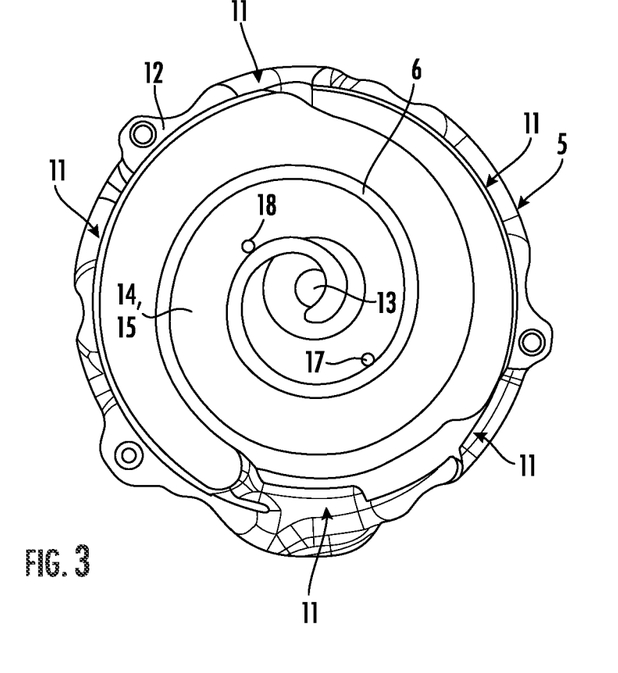
FIG. 3 is an axial end elevational view of a fixed scroll of the compression mechanism of FIG. 2 with the fixed scroll shown in isolation.

The fixed scroll 5, shown in FIG. 1, includes an end wall 14 including an inner face 15 and an opposing outer face 16. The inner face 15 faces towards the orbiting scroll 7 with the first spiral structure 6 extending axially from the inner face 15. The outer face 16 faces away from the orbiting scroll 7 and faces towards the previously mentioned valve assembly 20. The discharge opening 13, a first injection port 17, and a second injection port 18 are all formed through the end wall 14 from the inner face 15 to the outer face 16 thereof. FIG. 3 shows the inner face 15 of the end wall 14 with the orbiting scroll 7 omitted to better illustrate the positioning of the discharge opening 13 and the injection ports 17, 18 relative to the configuration of the first spiral structure 6.

A first borehole 3 and a spaced apart second borehole 4 may be formed to axially extend into the outer face 16 of the fixed scroll 5. Although each of the boreholes 3, 4 shown has a generally circular cross-sectional shape, it is understood that the boreholes 3, 4 may have any suitable shape, size, and configuration as desired. An axial depth of each of the boreholes 3, 4 corresponds to portions of a valve body 80 described hereinafter.

As shown in FIG. 1, each of the boreholes 3, 4 is in fluid communication and coaxial alignment with a respective one of the injection ports 17, 18. The first injection port 17 and the first borehole 3 are positioned substantially opposite the second injection port 18 and the second borehole 4 relative to the centrally disposed discharge opening 13, with each of the injection ports 17, 18 and the boreholes 3, 4 also spaced radially at a substantially equal distance from the discharge opening 13. The substantially opposite positioning of the injection ports 17, 18 allows for the first injection port 17 to fluidly communicate with a first one of each of the oppositely paired compression chambers 9 and the second injection port 18 to fluidly communicate with a second one of each of the oppositely paired compression chambers 9. As such, each of the compression chambers 9 progressing radially inwardly towards the discharge opening 13 is able to fluidly communicate with one of the injection ports 17, 18 at a substantially similar radial position relative to the discharge opening 13, which also corresponds to the refrigerant disposed within each of the opposing and paired compression chambers 9 having a similar pressure when fluidly communicating with the corresponding one of the injection ports 17, 18. The pressure of the refrigerant when reaching each of the injection ports 17, 18 may be referred to as an intermediate pressure having a value between the previously described suction pressure and discharge pressure.

A first housing portion 110 of the scroll compressor 1 is an open ended and hollow structure configured to mate with a second housing portion 112 and/or a third housing portion 116 of the scroll compressor 1 for enclosing the internal components thereof. The first housing portion 110 defines a housing cavity 111 configured to receive the fixed scroll 5 and the valve assembly 20 therein. It should be appreciated that alternative configurations of the housing components of the scroll compressor 1 may be provided so long as the relevant structures for directing the flow of the refrigerant are maintained as described hereinafter, including the use of additional housing components or the use of housing components having alternatively arranged joints present therebetween. More specifically, any combination of housing components may be utilized so long as the housing cavity 111 is provided to receive the fixed scroll 5 and the valve assembly 20 therein in a manner promoting operation of the valve assembly 20 as disclosed hereinafter.

The housing cavity 111 is in fluid communication with a refrigerant return passage (not shown). The refrigerant return passage provides fluid communication between the housing cavity 111 and another component (not shown) of the associated refrigerant circuit through which the refrigerant is passed after being initially compressed within the compression mechanism of the scroll compressor 1. For example, the component may be a separator (not shown) disposed downstream of the compression mechanism and upstream of a low pressure side of the scroll compressor 1 with respect to a general direction of flow of the refrigerant through the refrigerant circuit, such as a cyclone separator. The refrigerant return passage 112 is configured to receive a partial flow of the refrigerant after branching away from the refrigerant circuit. The partial flow of the refrigerant may have a pressure between the discharge pressure and the suction pressure and may bypass at least one component of the refrigerant circuit disposed upstream of the low pressure side of the scroll compressor 1. In some instances, the component from which the refrigerant branches back towards the refrigerant return passage 112 may be disposed immediately downstream of the compression mechanism and even from a downstream arranged portion of the scroll compressor 1 itself. It is understood that the refrigerant may return to the refrigerant return passage 112 from any component of the refrigerant circuit while remaining within the scope of the present disclosure so long as the refrigerant has the required characteristics for being injected back into the compression chambers 9 during the compression process occurring within the compression mechanism.

The refrigerant return passage 112 leads to an injection chamber 113 (shown in FIG. 1) of the first housing portion 110. The injection chamber 113 is an open space defined by an axially extending inner wall 114 formed in the housing cavity 111 between the refrigerant return passage and the valve assembly 20. The refrigerant entering the injection chamber 113 may be a gaseous vapor or a combination of a gaseous vapor and a liquid, depending on the circumstances of the returned refrigerant.

Figure 4:
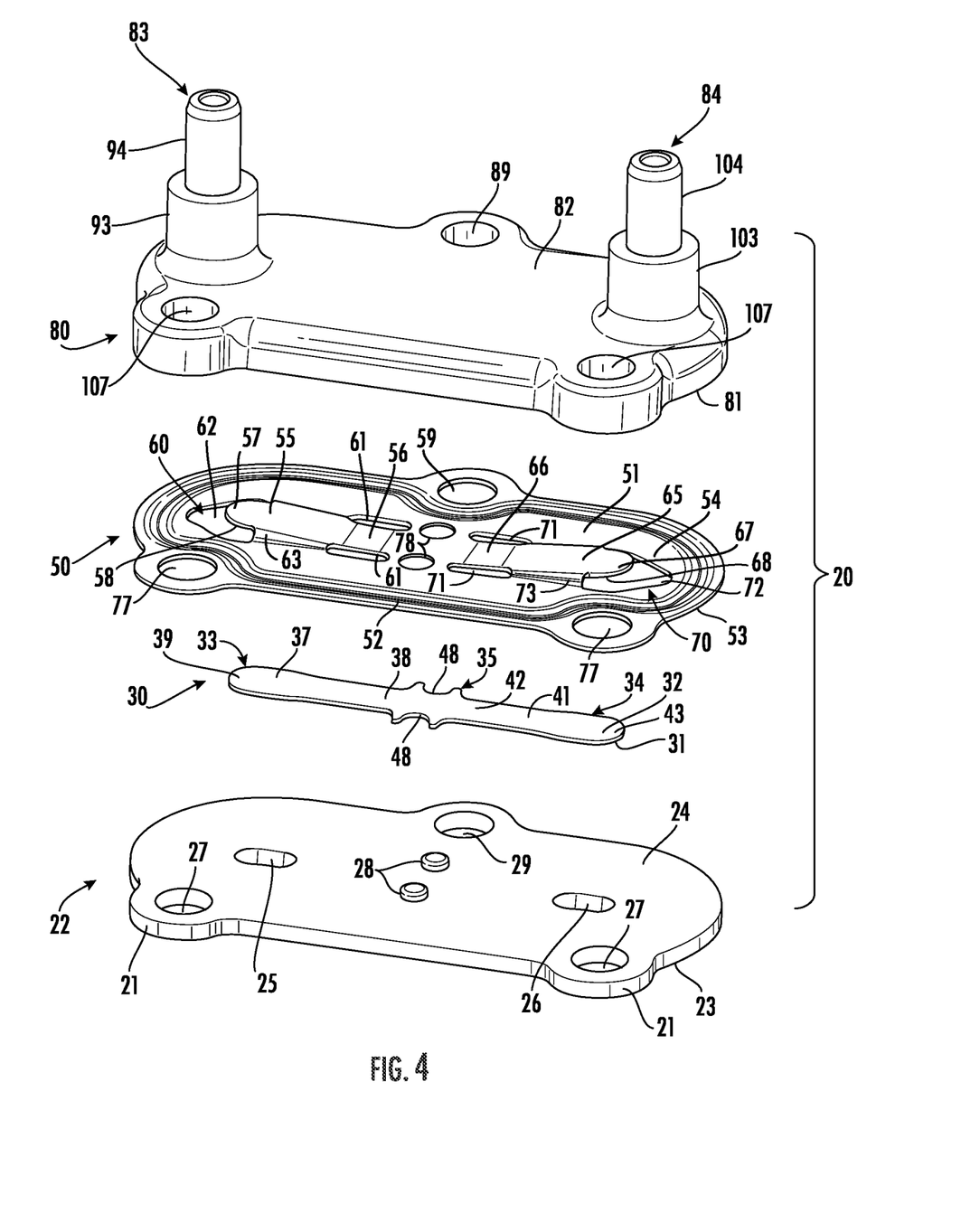
FIG. 4 is an exploded perspective view of an injection valve assembly of the scroll compressor of FIG. 1.

Referring to FIG. 4, the valve assembly 20 includes a valve member 22, a double reed structure 30, a first valve gasket 50, and the valve body 80, wherein the components are disposed in the provided order when progressing from the refrigerant return passage formed in the housing portion 110 towards the fixed scroll 5. The direction of assembly of the valve assembly 20 as shown by the direction of separation of the components forming the valve assembly 20 in the exploded view of FIG. 4 is hereinafter referred to as an axial direction of the valve assembly 20. The axial direction of the valve assembly 20 also corresponds to the axial direction of each of the constituent components thereof as used hereinafter.

The valve member 22 shown has a plate-like structure and includes a substantially planar first major surface 23 and an oppositely arranged and also substantially planar second major surface 24, wherein the major surfaces 23, 24 are arranged parallel to each other and perpendicular to the axial direction of the valve assembly 20. The first major surface 23 faces towards the refrigerant return passage 112 and the second major surface 24 faces towards the reed structure 30 and the first valve gasket 50.

The valve member 22 includes a first injection aperture 25 and a spaced apart second injection aperture 26. A discharge aperture 29 may also be formed to axially extend through the valve member 22. The discharge aperture 29 is in fluid communication with the discharge opening 13 formed in the fixed scroll 5. Each of the injection apertures 25, 26, 29 extends through the valve member 22 with respect to the axial direction from the first major surface 23 to the second major surface 24 thereof. A spacing between the injection apertures 25, 26 with respect to a direction perpendicular to the axial direction may be substantially similar to or equal to a spacing between the first injection port 17 and the second injection port 18 formed through the fixed scroll 5. Each of the injection apertures 25, 26 is in fluid communication with a respective one of the injection ports 17, 18 of the fixed scroll 5 and the injection chamber 113 formed in the housing portion 110. In certain embodiments, the injection chamber 113 is in fluid communication with the first injection port 17 via the first injection aperture 25 of the valve member 22 and in fluid communication with the second injection port 18 via the second injection aperture 26 of the valve member 22.

Each of the injection apertures 25, 26 is shown as having an elongated perimeter shape with a direction of elongation of each of the injection apertures 25, 26 arranged in parallel. The injection apertures 25, 26 may otherwise be referred to as injection slots 25, 26 due to the elongated configurations thereof. Each of the injection apertures 25, 26 is shown as having an elongate stadium shape, but other rounded and elongate shapes may be utilized such as an elliptical shape, oval shape, rounded rectangular shape, or the like. The elongate shape of each of the injection apertures 25, 26 beneficially provides for an increased cross-sectional flow area therethrough in comparison to a purely circular cross-sectional shape, which in turn increases the total force that can be applied by the returned refrigerant through each of the injection apertures 25, 26 with respect to a given pressure of the refrigerant. However, other shapes, including the circular shape, may be utilized while still appreciating the remaining beneficial characteristics of the valve assembly 20.

A second valve gasket 118 may be disposed between a periphery of the first major surface 23 and the inner wall 114 of the housing portion 110 defining the injection chamber 113. The second valve gasket 118 provides a substantially fluid-tight seal between the valve member 22 and the housing portion 110 to prevent refrigerant from bypassing the valve assembly 20 and fluidly communicating with the compression chambers 9 of the scrolls 5, 7.

The valve member 22 is generally elliptical in shape with a pair of spaced apart ear portions 21 projecting from the elliptical shape and each of the ear portions 21 having an opening 27 formed therethrough. The openings 27 may be disposed outwardly from a position of the perimeter of the second valve gasket 118 when sealingly engaging the valve member 22. Each of the openings 27 may be configured to axially receive a corresponding coupling element (not shown) for coupling and compressing the components of the valve assembly 20 together as explained in greater detail hereinafter. Various types of coupling elements may be employed such as mechanical fasteners, for example. Each of the coupling elements may be inserted into corresponding openings (not shown) provided in the surface of the housing portion 110 defining the housing cavity 111. Alternative coupling methods may also be utilized so long as the components forming the valve assembly 20 are compressed to one another for forming the necessary fluid-tight seals therebetween while maintaining the relationships between the components as explained hereinafter.

The valve member 22 also includes a pair of spaced apart locating features 28 formed therethrough. Each of the locating features 28 is configured to be received in a corresponding locating opening 78 therethrough when the valve assembly 20 is in the assembled configuration. The locating features 28 may be threaded fasteners, tabs, pins, or the like. The use of two of more of the locating features 28 ensures that the components of the valve assembly 20 do not translate in a direction perpendicular to the axial direction thereof or rotate about an axis arranged parallel to the axial direction thereof. However, other locating features such as cooperating projections and indentations may be present within the components forming the valve assembly 20 while remaining within the scope of the present invention.

The valve member 22 is formed from a rigid material resistant to deformation when subjected to the pressure applied by the returned refrigerant entering the injection chamber 113. The valve member 22 may be formed from a metallic material such as aluminum, aluminum alloy, steel, or the like, as desired.

The double reed structure 30 is disposed adjacent the valve member 22. In some embodiments, the double reed structure 30 is a thin and planar plate-like body including a first major surface 31 and an oppositely arranged second major surface 32 (best shown in FIGS. 6-8). The major surfaces 31, 32 are arranged parallel to each other and perpendicular to the axial direction of the valve assembly 20. The first major surface 31 is configured to face towards and engage the second major surface 24 of the valve member 22 and the second major surface 32 is configured to face towards and engage the first valve gasket 50 as explained in greater detail hereinafter.

The double reed structure 30 includes a first reed 33, a second reed 34, and a connecting portion 35. The reeds 33, 34 and the connecting portion 35 are integrally formed as one monolithic structure. The first reed 33 is formed opposite the second reed 34. In some embodiments, the first reed 33 may be linearly opposed or diametrically opposed to the second reed 34. The first reed 33 and the second reed 34 extend longitudinally away from the connecting portion 35 in opposing parallel directions perpendicular to the axial direction of the valve assembly 20 when the reeds 33, 34 are not flexed during operation of the scroll compressor 1. In the provided embodiment, the reeds 33, 34 and the connecting portion 35 cooperate to have a substantially linear configuration. It is understood that the connecting portion 35 and reeds 33, 34 may have any shape, size, and configuration.

The first reed 33 includes an arm 37 extending longitudinally between a pivot portion 38 and an end portion 39. The pivot portion 38 forms an axis about which the remainder of the first reed 33 (including the end portion 39 disposed at a distal end of the arm 37 opposite the pivot portion 38) flexes relative to the stationary connecting portion 35. The end portion 39 is disposed in alignment with the first injection aperture 25 of the valve member 22 with respect to the axial direction of the valve assembly 20. The arm 37 may include a substantially rectangular shape while the end portion 39 may include a substantially similar perimeter shape to the first injection aperture 25. For example, the end portion 39 may include an elongate stadium shape, elliptical shape, oval shape, rounded rectangular shape, or the like to ensure that the end portion 39 is capable of covering the first injection aperture 25 when engaging the valve member 22 around a periphery of the first injection aperture 25.

Similar to the first reed 33, the second reed 34 includes an arm 41 extending longitudinally between a pivot portion 42 and an end portion 43. The pivot portion 42 forms an axis about which the remainder of the second reed 34 (including the end portion 43 disposed at a distal end of the arm 41 opposite the pivot portion 42) flexes relative to the stationary connecting portion 35. The end portion 43 is disposed in alignment with the second injection aperture 26 of the valve member 22 with respect to the axial direction of the valve assembly 20. The arm 41 may include a substantially rectangular shape while the end portion 43 may include a substantially similar perimeter shape to the second injection aperture 26. For example, the end portion 43 may include an elongate stadium shape, elliptical shape, oval shape, rounded rectangular shape, or the like to ensure that the end portion 43 is capable of covering the second injection aperture 26 when engaging the valve member 22 around a periphery of the second injection aperture 26.

The double reed structure 30 further includes a pair of locating regions 48 formed in outer peripheries of the connecting portion 35. Each of the pair of the locating regions 48 is disposed in alignment with a corresponding one of the locating features 28 of the valve member 22. Each of the locating regions 48 is configured to receive a corresponding one of the locating features 28 therethrough and a remainder of the connecting portion 35 disposed between the locating features 28 when the valve assembly 20 is in the assembled configuration to properly position the double reed structure 30 relative to the valve member 22 as well as the first valve gasket 50.

The double reed structure 30 is formed from a resiliently flexible material allowing for each of the arms 37, 41 of the reeds 33, 34 to flex about the respective pivot portions 38, 42 away from the plane generally defined by the double reed structure 30. The resiliently flexible material is selected to allow for repeated elastic deformations of each of the reeds 33, 34 about the pivot portions 38, 42 while still allowing for each of the reeds 33, 34 to spring back to the original positions thereof wherein the reeds 33, 34 are arranged perpendicular to the axial direction of the valve assembly 20 and parallel to the major surfaces 31, 32 of the connecting portion 35 of the double reed structure 30. The flexing of each of the reeds 33, 34 away from the corresponding injection aperture 25, 26 requires a force being applied to each of the reeds 33, 34 that overcomes a spring force generated by the resiliency of each of the reeds 33, 34 at each of the corresponding pivot portions 38, 42. The double reed structure 30 may accordingly be formed from a suitable metallic material such as aluminum, steel, or alloys thereof.

The first valve gasket 50 includes a planar portion 51 having a thin and plate-like structure with the planar portion 51 having a first major surface 53 and an oppositely arranged second major surface 54, each of which is arranged substantially perpendicular to the axial direction of the valve assembly 20. A discharge aperture 59 may also be formed to axially extend through the first valve gasket 50. The discharge aperture 59 is in fluid communication with the discharge opening 13 formed in the fixed scroll 5 and/or the discharge aperture 29 of the valve member 22.

The first major surface 53 is configured to face towards and sealingly engage the second major surface 24 of the valve member 22 and the second major surface 54 is configured to face towards and sealingly engage a first major surface 81 of the valve body 80. More specifically, the first major surface 53 of the planar portion 51 is configured to sealingly engage the stationary and non-flexing connecting portion 35 of the double reed structure 30. In certain embodiments, the first major surface 53 may further includes a bead 52 projecting axially from a periphery thereof with the bead 52 configured to sealingly engage the second major surface 24 of the valve member 22 about a periphery thereof. The bead 52 engages the second major surface 24 peripherally to surround the injection apertures 25, 26 and the locating features 28 of the valve member 22 excluding the discharge apertures 59. The bead 52 projects from the remainder of the first major surface 53 a suitable axial distance to account for the thickness of the intervening double reed structure 30 when establishing the engagement with the valve member 22.

The first valve gasket 50 further includes a first flap 55 and a second flap 65, each of which extends from and is formed continuous with the planar portion 51 of the first valve gasket 50. In other words, the planar portion 51, the first flap 55, and the second flap 65 are all formed integrally as part of a unitary and monolithic structure. The first flap 55 and the second flap 65 each extend away from the planar portion 51 in opposing and parallel directions. The first flap 55 is aligned with the first reed 33 with respect to the axial direction of the valve assembly 20 and the second flap 65 is aligned with the second reed 34 with respect to the axial direction of the valve assembly 20.

The first flap 55 includes a proximate end 56 connected to and continuous with the planar portion 51 and a freely disposed distal end 57. The first flap 55 further includes a contact surface 58 formed continuous with the first major surface 53 of the planar portion 51 with the contact surface 58 facing towards the first reed 33 of the double reed structure 30. The first flap 55, and more specifically the contact surface 58 thereof, is arranged at an incline relative to the plane of the planar portion 51 with the first flap 55 inclined away from the valve member 22 and towards the valve body 80. The incline includes an axial distance present between the contact surface 58 and the connecting portion 35 of the double reed structure 30 progressively increasing as the first flap 55 extends from the proximate end 56 to the distal end 57. The contact surface 58 is configured to engage the first reed 33 when the first reed 33 is flexed or pivoted towards the contact surface 58 as a result of the pressure applied thereto by the refrigerant passing through the valve assembly 20. The contact surface 58 may include a substantially similar shape to the first reed 33 and may include a slightly larger size than the first reed 33 to ensure that the first reed 33 makes consistent contact with the contact surface 58 each time the first reed 33 is flexed towards the contact surface 58. The incline of the contact surface 58 may be substantially constant, but may also include a slight curvature to account for any curvature present in the first reed 33 as a result of the flexing thereof. The incline of the contact surface 58 may be at an angle of about 3-5 degrees relative to the plane of the planar portion 51, but other angles of inclination may be utilized while remaining within the scope of the present invention.

As best shown in FIG. 4, the inclined deviation of the first flap 55 from the planar portion 51 includes the formation of a peripheral opening 60 around at least a portion of the perimeter of the first flap 55. The peripheral opening 60 is configured to allow for passage of the refrigerant through the first valve gasket 50 when progressing towards the valve body 80. In the provided embodiment, the peripheral opening 60 is subdivided into a pair of proximate openings 61 adjacent the proximate end 56 and a distal opening 62 extending around the distal end 57, wherein the distal opening 62 is separated from the proximate openings 61 via a pair of opposing linking segments 63 connecting the planar portion 51 to the first flap 55 at opposing positions intermediate the proximate end 56 and the distal end 57 thereof. The linking segments 63 provide stiffness and stability to the first flap 55 to maintain the configuration of the first flap 55 when the first reed 33 flexes towards and engages the first flap 55.

The second flap 65 includes a proximate end 66 connected to and continuous with the planar portion 51 and a freely disposed distal end 67. The second flap 65 further includes a contact surface 68 formed continuous with the first major surface 53 of the planar portion 51 with the contact surface 58 facing towards the second reed 34 of the double reed structure 30. The second flap 65, and more specifically the contact surface 68 thereof, is arranged at an incline relative to the plane of the planar portion 51 with the second flap 65 inclined away from the valve member 22 and towards the valve body 80. The incline includes an axial distance present between the contact surface 68 and the connecting portion 35 of the double reed structure 30 progressively increasing as the second flap 65 extends from the proximate end 66 to the distal end 67. The contact surface 68 is configured to engage the second reed 34 when the second reed 34 is flexed or pivoted towards the contact surface 68 as a result of the pressure force applied thereto by the refrigerant passing through the valve assembly 20. The contact surface 68 may include a substantially similar shape to the second reed 34 and may include a slightly larger size than the second reed 34 to ensure that the second reed 34 makes consistent contact with the contact surface 68 each time the second reed 34 is flexed towards the contact surface 68. The incline of the contact surface 68 may be substantially constant, but may also include a slight curvature to account for any curvature present in the second reed 34 as a result of the flexing thereof. The incline of the contact surface 68 may be at an angle of about 3-5 degrees relative to the plane of the planar portion 51, but other angles of inclination may be utilized while remaining within the scope of the present invention.

The inclined deviation of the second flap 65 from the planar portion 51 includes the formation of a peripheral opening 70 around at least a portion of the perimeter of the second flap 65. The peripheral opening 70 is configured to allow for passage of the refrigerant through the first valve gasket 50 when progressing towards the valve body 80. In the provided embodiment, the peripheral opening 70 is subdivided into a pair of proximate openings 71 adjacent the proximate end 66 and a distal opening 72 extending around the distal end 67, wherein the distal opening 72 is separated from the proximate openings 71 via a pair of opposing linking segments 73 connecting the planar portion 51 to the second flap 65 at opposing positions intermediate the proximate end 66 and the distal end 67 thereof. The linking segments 73 provide stiffness and stability to the second flap 65 to maintain the configuration of the second flap 65 when the second reed 34 flexes towards and engages the second flap 65.

The first valve gasket 50 includes two openings 77 formed therethrough at positions exterior to the bead 52. Each of the openings 77 is disposed in alignment with a corresponding one of the openings 27 of the valve member 22 and is configured to receive a corresponding one of the coupling elements therethrough. The first valve gasket 50 further includes a pair of the locating openings 78 formed therethrough at positions interior to the bead 52. Each of the locating openings 78 is disposed in alignment with a corresponding one of the locating regions 48 of the double reed structure 30 and is configured to receive a corresponding one of the locating features 28 therethrough.

The entirety of the first valve gasket 50 (including the planar portion 51, the bead 52, the first flap 55, and the second flap 65) is formed from a resiliently compressible material suitable for sealingly engaging each of the corresponding surfaces of the valve member 22, the double reed structure 30, and the valve body 80 as described above. The first valve gasket 50 may be formed from a metal material and/or a non-metal material (e.g., a polymeric material, an elastomer), as desired. The use of the elastomeric material in forming the first valve gasket 50 prevents repeated metal-to-metal contact with the reeds 33, 34 during operation of the scroll compressor 1, which increases a durability of the double reed structure 30 due to the relative softness of the elastomeric material in comparison to a stiff metallic material.

Figure 5:
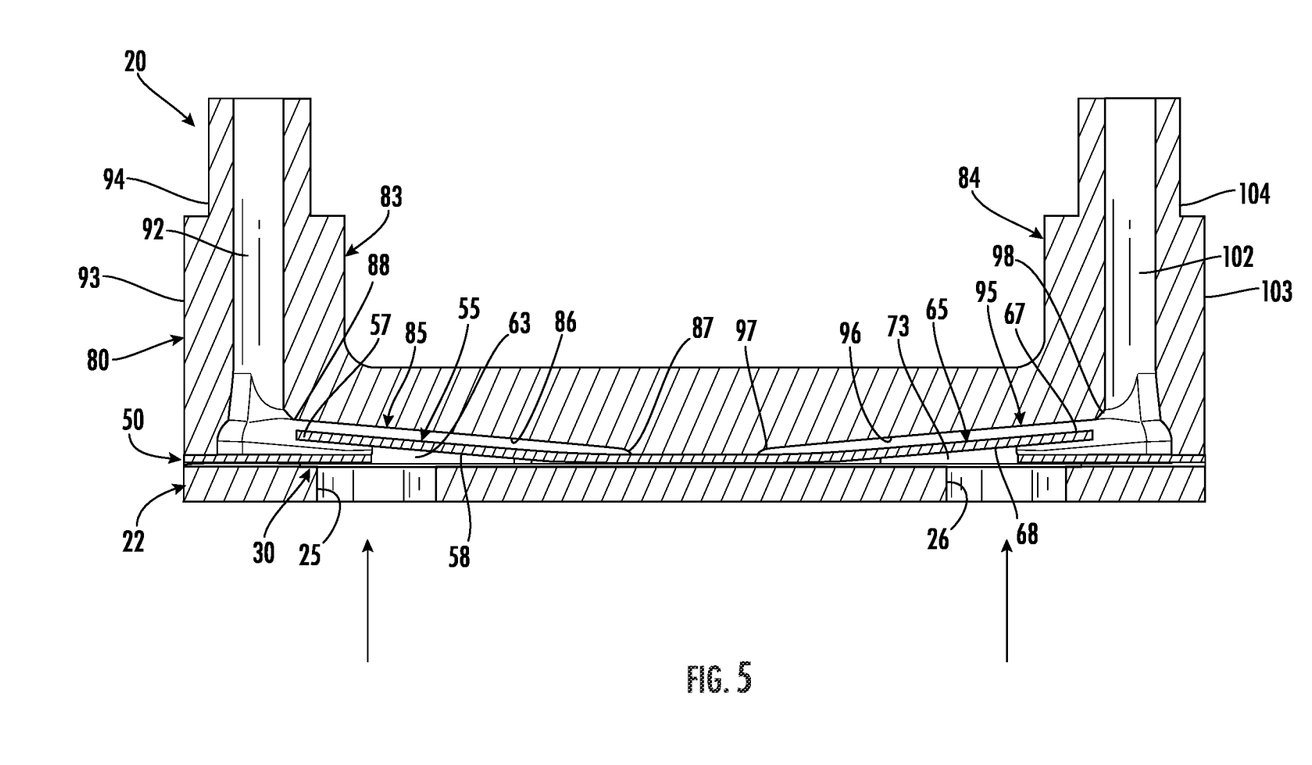
FIG. 5 is cross-sectional view of the injection valve assembly of FIG. 4, wherein arrows indicate a direction of a flow of a fluid therethrough.
Figure 6:
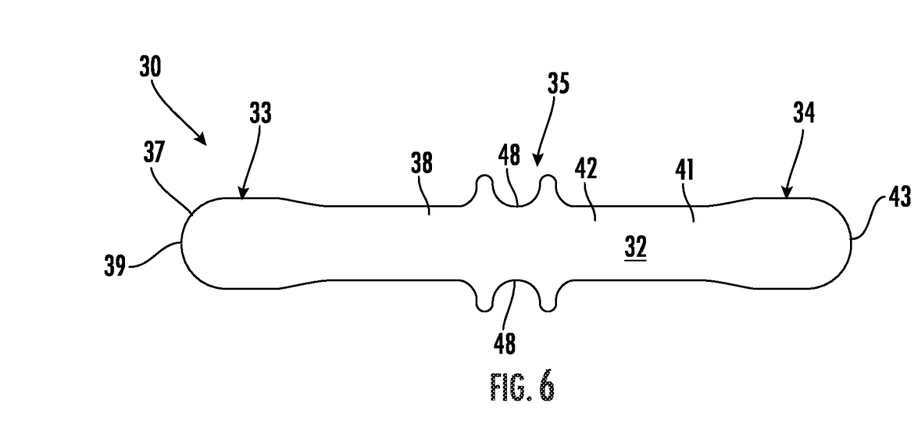
FIG. 6 is a top plan view of a double reed structure of the injection valve assembly of FIGS. 4 and 5.
Figure 7:
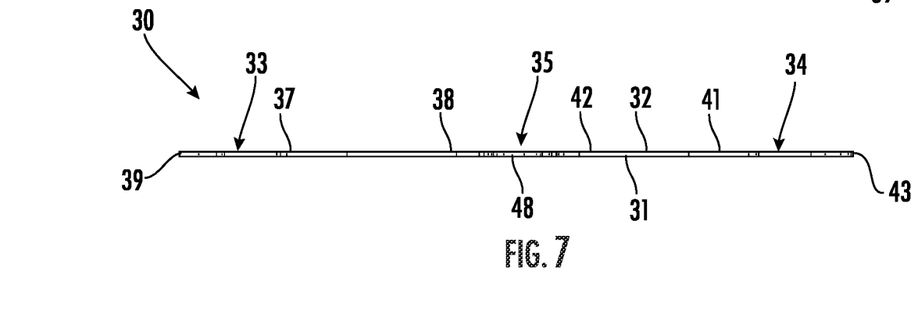
FIG. 7 is a side elevational view of the double reed structure of FIG. 6.
Figure 8:
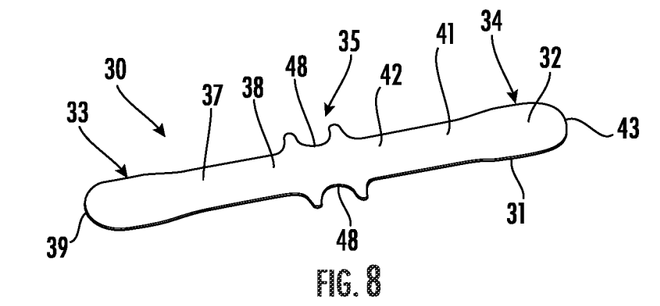
FIG. 8 is a perspective view of the double reed structure of FIGS. 6 and 7.

The valve body 80 is disposed between the fixed scroll 5 and the first valve gasket 50. The valve body 80 includes a periphery of the first major surface 81 thereof configured to engage a periphery of the second major surface 54 of the planar portion 51 of the first valve gasket 50. The periphery of the first major surface 81 is arranged perpendicular to the axial direction of the valve assembly 20. A second major surface 82 of the valve body 80 formed opposite the first major surface 81 faces towards the outer face 16 of the fixed scroll 5. As best seen in FIG. 5, the first major surface 81 includes a first indentation 85 and a spaced apart second indentation 95 formed therein with the indentations 85, 95 extending longitudinally in parallel to each other. A discharge aperture 89 may also be formed to axially extend through the valve body 82. The discharge aperture 89 is in fluid communication with the discharge opening 13 formed in the fixed scroll 5, and/or the discharge aperture 29 of the valve member 22, and/or the discharge aperture 59 of the first valve gasket 50.

The first indentation 85 is disposed in alignment with the first flap 55 with respect to the axial direction of the valve assembly 20 with at least a portion of the inclined first flap 55 extending into the first indentation 85. The first indentation 85 is defined by a surface 86 inclined at an angle relative to the plane of the periphery of the first major surface 81. The surface 86 extends from a proximate end 87 disposed adjacent the proximate end 56 of the first flap 55 to a distal end 88 disposed adjacent the distal end 57 of the first flap 55. An axial depth of the first indentation 85 increases as the surface 86 progresses from the proximate end 87 to the distal end 88 thereof to cause the distal end 88 to have a maximized depth towards the fixed scroll 5. The angle of inclination of the surface 86 may substantially correspond to the angle of inclination of the first flap 55, such as being inclined at about 3-5 degrees, but alternative configurations may be utilized without necessarily departing from the scope of the present invention.

The second indentation 95 is disposed in alignment with the second flap 65 with respect to the axial direction of the valve assembly 20 with at least a portion of the inclined second flap 65 extending into the second indentation 95. The second indentation 95 is defined by a surface 96 inclined at an angle relative to the plane of the periphery of the first major surface 81. The surface 96 extends from a proximate end 97 disposed adjacent the proximate end 66 of the second flap 65 to a distal end 98 disposed adjacent the distal end 67 of the second flap 65. An axial depth of the second indentation 95 increases as the surface 96 progresses from the proximate end 97 to the distal end 98 thereof to cause the distal end 98 to have a maximized depth towards the fixed scroll 5. The angle of inclination of the surface 96 may substantially correspond to the angle of inclination of the second flap 65, such as being inclined at about 3-5 degrees, but alternative configurations may be utilized without necessarily departing from the scope of the present invention.

The second major surface 82 of the valve body 80 includes a first post 83 projecting axially therefrom and towards the fixed scroll 5. In some embodiments, at least a portion of the first post 83 is received into the first borehole 3 formed in the fixed scroll 5. A first flow passageway 92 is formed through the valve body 80 and extends from the first indentation 85 to an axial end of the first post 83 engaging the fixed scroll 5 around a periphery of the first injection port 17. The first flow passageway 92 provides fluid communication between the first indentation 85 and the first injection port 17 of the fixed scroll 5. An O-ring or similar sealing element (not shown) may be disposed between a portion of the first post 83 and the outer face 16 of the fixed scroll 5 or a surface defining the first injection port 17 to fluidly seal the joint therebetween. The first flow passageway 92 may extend from the distal end 88 of the surface 86 defining the first indentation 85 at a position offset from the distal end 57 of the first flap 55 with respect to a direction perpendicular to the axial direction of the valve assembly 20. The offset may be present to prevent too great of a change of direction of the refrigerant when flowing from the distal end 57 of the first flap 55 towards the first flow passageway 92. The first indentation 85 and the first flow passageway 92 accordingly cooperate to form a first flow path through the valve body 80 configured for fluid communication with the first injection port 17.

In some embodiments, the first flow passageway 92 is formed in a first segment 93 of the first post 83 extending from the surface 86 of the first indentation 85 and a second segment 94 of the first post 83 extending from the first segment 93 to the end of the first post 83. The first segment 93 and the second segment 94 are each shown as having a substantially cylindrical shape for forming a substantially circular cross-sectional flow area of the first flow passageway 92 through each of the segments 93, 94, but alternative configurations of the first post 83 and the first flow passageway 92 may be utilized without necessarily departing from the scope of the present invention. The first segment 93 shown includes a first diameter that is greater than a second diameter of the second segment 94. However, the first flow passageway 92 formed in the first segment 93 and the second segment 94 may have a generally constant cross-sectional flow area. In other embodiments, a first part of the first flow passageway 92 formed in the first segment 93 may have a greater cross-sectional flow area than a second part of the first flow passageway 92 formed in the second segment 94. The first part of the first flow passageway 92 having a larger cross-sectional area than the second part of the first flow passageway 92 reduces a pressure drop experienced by the refrigerant when flowing through the first flow passageway 92 to minimize flow losses during operation of the valve assembly 20. Additionally, the cross-sectional flow area through the first indentation 85 immediately upstream of the first flow passageway 92 may also be greater than that of the first part thereof, thereby further ensuring the absence of the pressure drop and flow loss.

The second major surface 82 of the valve body 80 includes a second post 84 projecting axially therefrom and towards the fixed scroll 5. In some embodiments, at least a portion of the second post 84 is received into the second borehole 4 formed in the fixed scroll 5. A second flow passageway 102 is formed through the valve body 80 and extends from the second indentation 95 to an axial end of the second post 84 engaging the fixed scroll 5 around a periphery of the second injection port 18. The second flow passageway 102 provides fluid communication between the second indentation 95 and the second injection port 18 of the fixed scroll 5. An O-ring or similar sealing element (not shown) may be disposed between a portion of the second post 84 and the outer face 16 of the fixed scroll 5 or a surface defining the second injection port 18 to fluidly seal the joint therebetween. The second flow passageway 102 may extend from the distal end 98 of the surface 96 defining the second indentation 95 at a position offset from the distal end 67 of the second flap 65 with respect to a direction perpendicular to the axial direction of the valve assembly 20. The offset may be present to prevent too great of a change of direction of the refrigerant when flowing from the distal end 67 of the second flap 65 towards the second flow passageway 102. The second indentation 95 and the second flow passageway 102 accordingly cooperate to form a second flow path through the valve body 80 configured for fluid communication with the second injection port 18.

In some embodiments, the second flow passageway 102 is formed in a first segment 103 of the second post 84 extending from the surface 96 of the second indentation 95 and a second segment 104 of the second post 84 extending from the first segment 103 to the end of the second post 84. The first segment 103 and the second segment 104 are each shown as having a substantially cylindrical shape for forming a substantially circular cross-sectional flow area of the second flow passageway 102 through each of the segments 103, 104, but alternative configurations of the second post 84 and the second flow passageway 102 may be utilized without necessarily departing from the scope of the present invention. The first segment 103 includes a first diameter that is greater than a second diameter of the second segment 104. However, the second flow passageway 102 formed in the first segment 103 and the second segment 104 may have a generally constant cross-sectional flow area. In other embodiments, a first part of the second flow passageway 102 formed in the first segment 103 may have a greater cross-sectional flow area than a second part of the second flow passageway 102 formed in the second segment 104. The first part of the second flow passageway 102 having a larger cross-sectional area than the second part of the second flow passageway 102 reduces a pressure drop experienced by the refrigerant when flowing through the second flow passageway 102 to minimize flow losses during operation of the valve assembly 20. Additionally, the cross-sectional flow area through the second indentation 95 immediately upstream of the second flow passageway 102 may also be greater than that of the first part thereof, thereby further ensuring the absence of the pressure drop and flow loss.

The valve body 80 includes two openings 107 formed therethrough about a periphery thereof with each of the two openings 107 disposed in alignment with a corresponding one of the openings 77 of the first valve gasket 50 and configured to receive a corresponding one of the coupling elements therethrough. The valve body 80 further includes a pair of locating recesses (not shown) formed therein with each of the pair of the locating recesses disposed in alignment with a corresponding one of the locating openings 78 of the first valve gasket 50 and configured to receive a corresponding one of the locating features 28 therein.

The valve body 80 is formed from a rigid material resistant to deformation when subjected to the pressure applied by the refrigerant passing through the valve assembly 20. The valve body 80 may be formed from a metallic material such as aluminum, aluminum alloy, steel, or the like, as desired.

Operation of the valve assembly 20 is now described. Because the flow configuration of the refrigerant is substantially identical with respect to each of the partial refrigerant flows entering each of the injection ports 17, 18, only the partial refrigerant flow passing from the first injection aperture 25 to the first injection port 17 is described in detail hereinafter with the understanding that the corresponding and analogous components associated with the other partial refrigerant flow passing from the second injection aperture 26 to the second injection port 18 operate in the same manner.

During operation of the scroll compressor 1, at least a portion of the refrigerant discharged from the compression mechanism formed by the cooperating scrolls 5, 7 is returned back to the injection chamber 113 via the refrigerant return passage. The end portion 39 of the first reed 33 is configured to normally extend across and cover the first injection aperture 25 to prevent undesired flow of the returned refrigerant from the injection chamber 3 and towards the first injection port 17. The compression mechanism of the scroll compressor 1 operates to cause the first injection port 17 to repeatedly experience a variable pressure of the refrigerant within the compression mechanism depending on the progression of each subsequent compression chamber 9 passing by the first injection port 17.

When the variable pressure experienced by the first injection port 17 from the refrigerant originating from within the compression mechanism is relatively high, the end portion 39 of the first reed 33 is maintained against the surface of the valve member 22 surrounding the first injection aperture 25 to continue to prevent the passage of the refrigerant within the injection chamber 113 towards the first injection port 17. However, when the variable pressure experienced by the first injection port 17 from the refrigerant originating from within the compression mechanism is relatively low, the pressure of the refrigerant within the injection chamber 113 eventually exceeds the relatively low pressure originating from the compression mechanism and a pressure differential is established across the opposing surfaces of the end portion 39 of the first reed 33. When the force of the pressure of the refrigerant within the injection chamber 113 exceeds the combined force of the pressure of the refrigerant originating from the compression mechanism and a spring force generated by a resiliency of the first reed 33 at the pivot portion 38 thereof, the first reed 33 pivots about the axis defined by the pivot portion 38 and towards the valve body 80. The pivoting of the first reed 33 causes the refrigerant within the injection chamber 113 to pass through the first injection aperture 25 and around the now axially spaced end portion 39 of the first reed 33. The first reed 33 may pivot until encountering the contact surface 58 of the first flap 55 of the first valve gasket 50, which provides a relatively soft stop limiting the rotation of the first reed 33.

The refrigerant originating from the injection chamber 113 then proceeds through the open space formed by the first indentation 85 of the valve body 80 while passing through the first valve gasket 50 via the peripheral opening 60 surrounding the first flap 55. The refrigerant then flows towards and passes through the first flow passageway 92 and into the first injection port 17. The refrigerant is then injected into the corresponding compression chamber 9 while having a higher pressure than the refrigerant already disposed within the compression chamber 9 and originating from one of the inlet openings 11 of the fixed scroll 5, which allows for the compression capacity of the scroll compressor 1 to be increased by reintroducing higher pressure refrigerant into the compression mechanism at an intermediate position of the compression process.

The first reed 33 eventually resiliently springs back to the position blocking flow from the injection chamber 113 through the valve assembly 20 based on the cycling of the compression mechanism and the resulting pressure differential on the opposing sides of the first reed 33. The valve assembly 20 accordingly acts a check valve for preventing a flow of the refrigerant in an undesired direction relative to the first reed 33, which in turn prevents the refrigerant originating from the compression mechanism back-flowing into the injection chamber 113 in an undesired flow direction. The described process is repeatedly performed as the pressure experienced by the first injection port 17 is varied with respect to each passing compression chamber 9 formed by the orbiting of the orbiting scroll 7 relative to the fixed scroll 5.

The valve assembly 20 as shown and described offers numerous advantageous features. As is apparent from a review of FIGS. 3-8, a first half of the valve assembly 20 having the components associated with the partial flow towards the first injection port 17 and a second half of the valve assembly 20 having the components associated with the partial flow towards the second injection port 18 are substantially structurally identical with the second half rotated 180 degrees relative to the first half with respect to a central axis passing through the valve assembly 20, wherein the central axis substantially corresponds to the position of the discharge opening 13 of the fixed scroll 5 and the position at which the refrigerant return passageway intersects the injection chamber 113. This 180 degree rotated relationship between the two partial flows results in a more even distribution of the refrigerant to each of the injection ports 17, 18 as each of the partial flows experiences substantially similar flow conditions and flow path lengths. The elongation of each of the injection apertures 25, 26 allows for a greater pressure force to be applied to each of the reeds 33, 34 for selectively actuating the reeds 33, 34. The unitary formation of the double reed structure 30 simplifies the manufacturing of the valve assembly 20. The inclined flaps 55, 65 of the first valve gasket 50 provide soft contact surfaces 58, 68 for preventing metal-to-metal contact with the reeds 33, 34 during repeated flexing of the reeds 33, 34. This soft contact increases the durability of the reeds 33, 34 and prevents the generation of NVH that could be experienced within the passenger compartment of the vehicle. The inclined configuration of the flaps 55, 65 also prescribed the degree of flex experienced by each of the reeds 33, 34, which further improves the durability of the reeds 33, 34 at the respective pivot portions 38, 42 thereof. The progressively decreasing flow area through each of the flows paths formed through the valve body 80 prevents an undesired pressure drop or flow loss for the refrigerant when flowing towards the respective injection ports 17, 18.

The valve assembly 30 as shown and described offers numerous advantageous features. As is apparent from FIGS. 4-8, the valve assembly 30 is simple and compact in design requiring fewer components than conventional check valves, which also results in a mass reduction of the scroll compressor 1. The unitary formation of the double reed structure 40 having the opposing reeds 43, 44 reduces the time and cost of manufacturing, enhances sealing, and increases vapor injection volume of the valve assembly 30. Additionally, the valve assembly 30 allows for a smaller injection chamber 113 and an increase in a volume of a discharge chamber formed in the housing portion 110, which in turn results in discharge pulsation noise reduction.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A valve assembly for a scroll compressor, comprising:
a valve member including a first injection aperture and a second injection aperture formed therethrough, wherein the first injection aperture is in fluid communication with a first injection port of the scroll compressor and the second injection aperture is in fluid communication with a second injection port of the scroll compressor; and
a reed structure disposed adjacent the valve member, the reed structure including a first reed and an opposite second reed, and a connecting portion connecting the first reed and the second reed, wherein the reed structure selectively permits a flow of a fluid through at least one of the first injection port and the second injection port of the scroll compressor, wherein the first reed, the second reed, and the connecting portion are formed as a unitary structure and cooperate to have a linear configuration, and wherein the reed structure further includes a pair of locating regions formed in outer peripheries of the connecting portion to face each other.

2. The valve assembly of claim 1, wherein the first reed configured to selectively permit the fluid to flow through the first injection port of the scroll compressor.

3. The valve assembly of claim 1, wherein the second reed configured to selectively permit the fluid to flow through the second injection port of the scroll compressor.

4. The valve assembly of claim 1, wherein the first injection port is in fluid communication with an injection chamber formed in the scroll compressor.

5. The valve assembly of claim 1, wherein the second injection port is in fluid communication with an injection chamber formed in the scroll compressor.

6. The valve assembly of claim 1, further comprising a valve body disposed adjacent the valve member.

7. The valve assembly of claim 6, further comprising a valve gasket disposed between the reed structure and the valve body, the valve gasket including a first flap configured to contact the first reed when the first reed selectively permits the fluid to flow through a first injection hole towards a first flow path.

8. The valve assembly of claim 7, wherein the first flap is inclined relative to a plane of the valve member.

9. The valve assembly of claim 7, wherein the first reed is configured to pivot away from the valve member when the first reed selectively permits the fluid to flow through the first injection hole, and wherein the first flap forms a stop surface for limiting the pivoting of the first reed away from the valve member.

10. The valve assembly of claim 7, wherein a peripheral opening extends around at least a portion of a periphery of the first flap.

11. The valve assembly of claim 6, wherein the valve body includes a first indentation formed therein and a first flow passageway extending from the first indentation through the valve body.

12. The valve assembly of claim 11, wherein the first reed pivots into the first indentation of the valve body when the first reed selectively permits the fluid to flow through the valve assembly to the first injection port of the scroll compressor.

13. The valve assembly of claim 11, wherein the valve body further includes a first post having a first segment and a second segment, and wherein a part of the first flow passageway is formed in the first segment of the first post extending from the first indentation to the second segment and another part of the first flow passageway is formed in the second segment of the first post extending from the first segment to an end thereof.

14. The valve assembly of claim 13, wherein at least a portion of the first post is received in a fixed scroll of the scroll compressor.

15. A valve assembly for a scroll compressor, comprising:
a valve member including a first injection aperture and a second injection aperture formed therethrough, wherein the first injection aperture is in fluid communication with a first injection port of the scroll compressor and the second injection aperture is in fluid communication with a second injection port of the scroll compressor;
a valve gasket disposed adjacent the valve member, the valve gasket including a first flap and a second flap; and
a reed structure disposed between the valve member and the valve gasket, the reed structure including a first reed and an opposite second reed, and a connecting portion connecting the first reed and the second reed, wherein the first reed selectively contacts the first flap of the valve gasket and the second reed selectively contacts the second flap of the valve gasket, wherein the first reed, the second reed, and the connecting portion are formed as a unitary structure and cooperate to have a linear configuration, and wherein the reed structure further includes a pair of locating regions formed in outer peripheries of the connecting portion to face each other.

16. The valve assembly of claim 15, further comprising a valve body, wherein the valve body includes a first indentation and a second indentation formed therein.

17. The valve assembly of claim 16, wherein the first flap of the valve gasket is received in the first indentation of the valve body and the second flap of the valve gasket is received in the second indentation of the valve body.

18. A scroll compressor, comprising:
a compression mechanism including a fixed scroll and an orbit scroll, wherein the fixed scroll includes a first borehole provided with a first injection port and a second borehole provided with a second injection port; and
a valve assembly coupled to the fixed scroll, the valve assembly comprising:
a valve member including a first injection aperture and a second injection aperture formed therethrough, wherein the first injection aperture is in fluid communication with the first injection port of the fixed scroll and the second injection aperture is in fluid communication with the second injection port of the fixed scroll; and
a reed structure disposed adjacent the valve member, the reed structure including a first reed and an opposite second reed, and a connecting portion connecting the first reed and the second reed, wherein the reed structure selectively permits a flow of a fluid through at least one of the first injection port and the second injection port of the scroll compressor, wherein the first reed, the second reed, and the connecting portion are formed as a unitary structure and cooperate to have a linear configuration, and wherein the reed structure further includes a pair of locating regions formed in outer peripheries of the connecting portion to face each other.

19. The valve assembly of claim 18, further comprising a valve body disposed between the valve member and the fixed scroll, wherein the valve body further includes a first post configured to be at least partially received in the first borehole and a second post configured to be at least partially received in the second borehole.

* * * * *